US012647802B2

(12) United States Patent
Ren et al.

(10) Patent No.: US 12,647,802 B2
(45) Date of Patent: Jun. 2, 2026

(54) TRIGGERING MECHANISM FOR REMOTE INTERFERENCE MANAGEMENT

(71) Applicant: QUALCOMM Incorporated, San Diego, CA (US)

(72) Inventors: Yuwei Ren, Beijing (CN); Huilin Xu, Temecula, CA (US); Yiqing Cao, Beijing (CN); Jay Kumar Sundararajan, San Diego, CA (US); Yeliz Tokgoz, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 685 days.

(21) Appl. No.: 17/250,897

(22) PCT Filed: Sep. 23, 2019

(86) PCT No.: PCT/CN2019/107181
§ 371 (c)(1),
(2) Date: Mar. 22, 2021

(87) PCT Pub. No.: WO2020/063503
PCT Pub. Date: Apr. 2, 2020

(65) Prior Publication Data
US 2021/0352494 A1     Nov. 11, 2021

(30) Foreign Application Priority Data

Sep. 24, 2018    (WO) ............... PCT/CN2018/107182

(51) Int. Cl.
*H04W 24/02*     (2009.01)
*H04J 11/00*     (2006.01)
*H04W 52/24*     (2009.01)

(52) U.S. Cl.
CPC ......... *H04W 24/02* (2013.01); *H04W 52/243* (2013.01); *H04J 11/0056* (2013.01)

(58) Field of Classification Search
CPC ... H04W 24/02; H04W 52/243; H04W 72/27; H04W 72/541; H04J 11/0056; H04L 5/0053
See application file for complete search history.

(56) References Cited

U.S. PATENT DOCUMENTS

| | | | | |
|---|---|---|---|---|
| 2007/0149129 | A1* | 6/2007 | Das | H04W 72/21 |
| | | | | 455/67.11 |
| 2009/0197538 | A1* | 8/2009 | Borran | H04W 52/243 |
| | | | | 455/63.1 |

(Continued)

FOREIGN PATENT DOCUMENTS

| | | |
|---|---|---|
| CN | 101394649 A | 3/2009 |
| CN | 102655650 A | 9/2012 |

(Continued)

OTHER PUBLICATIONS

International Search Report and Written Opinion—PCT/CN2018/107182—ISA/EPO—Jun. 26, 2019.

(Continued)

*Primary Examiner* — Ivan O Latorre
(74) *Attorney, Agent, or Firm* — Harrity & Harrity, LLP

(57) ABSTRACT

Various aspects of the present disclosure generally relate to wireless communication. In some aspects, a base station may determine that at least one condition, of a plurality of conditions, is satisfied with regard to at least one other base station; and perform at least one remote interference management (RIM) operation, the at least one RIM operation selected based at least in part on the at least one condition. In some aspects, a base station may receive an indication regarding interference, the indication regarding interference indicating that at least one condition, of a plurality of (Continued)

conditions, is satisfied with regard to the base station or at least one other base station; and perform at least one RIM operation, the at least one RIM operation selected based at least in part on the at least one condition or the indication regarding interference. Numerous other aspects are provided.

30 Claims, 6 Drawing Sheets

(56) References Cited

U.S. PATENT DOCUMENTS

| 2010/0215032 A1* | 8/2010 | Jalloul | H04L 27/2655 |
| | | | 370/350 |
| 2011/0116480 A1* | 5/2011 | Li | H04W 28/04 |
| | | | 370/332 |
| 2012/0122503 A1* | 5/2012 | Ma | H04W 16/10 |
| | | | 455/501 |
| 2012/0135677 A1* | 5/2012 | Hsu | H04W 76/30 |
| | | | 455/11.1 |
| 2013/0235743 A1* | 9/2013 | Goldhamer | H04W 52/243 |
| | | | 370/252 |
| 2013/0244658 A1* | 9/2013 | Tanaka | H04W 36/0064 |
| | | | 455/436 |
| 2014/0056190 A1 | 2/2014 | Qian et al. | |
| 2014/0098746 A1* | 4/2014 | Luo | H04W 52/143 |
| | | | 370/328 |
| 2014/0105118 A1* | 4/2014 | Senarath | H04B 17/345 |
| | | | 370/329 |
| 2014/0106769 A1* | 4/2014 | Bai | H04W 52/243 |
| | | | 455/452.1 |
| 2014/0219113 A1* | 8/2014 | Li | H04W 24/08 |
| | | | 370/252 |
| 2014/0233457 A1* | 8/2014 | Koutsimanis | H04L 5/0073 |
| | | | 370/328 |
| 2015/0016293 A1* | 1/2015 | Zhang | H04B 7/024 |
| | | | 370/252 |
| 2015/0045049 A1* | 2/2015 | Sawai | H04J 11/0056 |
| | | | 455/452.1 |
| 2015/0092627 A1* | 4/2015 | Liu | H04B 7/2656 |
| | | | 370/280 |
| 2015/0215940 A1* | 7/2015 | Goldhamer | H04W 24/10 |
| | | | 370/252 |
| 2015/0305068 A1* | 10/2015 | Hsu | H04W 72/046 |
| | | | 370/329 |
| 2015/0382360 A1 | 12/2015 | Huang et al. | |
| 2016/0065251 A1 | 3/2016 | Yoo et al. | |
| 2016/0112165 A1* | 4/2016 | Ouyang | H04W 56/001 |
| | | | 370/280 |
| 2017/0230152 A1 | 8/2017 | Byun et al. | |
| 2018/0295617 A1* | 10/2018 | Abdelmonem | H04L 1/242 |
| 2020/0106589 A1* | 4/2020 | Xu | H04L 5/0073 |
| 2021/0168642 A1* | 6/2021 | Kimba Dit Adamou | |
| | | | H04W 24/10 |
| 2021/0352494 A1* | 11/2021 | Ren | H04W 52/243 |

FOREIGN PATENT DOCUMENTS

| CN | 102833793 A | 12/2012 |
| CN | 103563477 A | 2/2014 |
| CN | 104053241 A | 9/2014 |
| WO | 2012126081 A1 | 9/2012 |

OTHER PUBLICATIONS

International Search Report and Written Opinion—PCT/CN2019/107181 —ISA/EPO—Dec. 20, 2019.

Ericsson: "On Mechanism for Identifying Strong gNB Interferers", 3GPP TSG-RAN WG1 Meeting #94, Tdoc R1-1808823 On Mechanisms for Identifying Strong gNB Interferers, 3rd Generation Partnership Project, Mobile Competence Centre, 650, Route Des Lucioles, F-06921 Sophia-Antipolis CE, vol. RAN WG1, No. Goteborg, Sweden, Aug. 20, 2018-Aug. 24, 2018, Aug. 10, 2018, XP051516196, 6 Pages.

Qualcomm Incorporated: "Mechanisms for Identifying Strong gNB Interferers", 3GPP TSG RAN WG1 Meeting #94, R1-1809456_ Mechanisms for Identifying Strong GNB Interferers, 3rd Generation Partnership Project, Mobile Competence Centre, 650, Route Des Lucioles, F-06921 Sophia-Antipolis Cedex, France, vol. RAN WG1, Aug. 17, 2018, pp. 1-3, XP051516821, Gothenburg, Sweden, Aug. 20-Aug. 24, 2018.

Samsung: "Mechanisms for Improving Network Robustness", 3GPP TSG RAN WG1 #94, R1-1808785 Mechanisms for Improving Network Robustness, 3rd Generation Partnership Project, Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, Aug. 11, 2018, pp. 1-3, XP051516158.

Supplementary European Search Report—EP19864350—Search Authority—The Hauge—May 13, 2022.

* cited by examiner

510   Determine that at least one condition, of a plurality of conditions, is satisfied with regard to at least one other base station 520   Perform at least one remote interference management (RIM) operation, the at least one RIM operation selected based at least in part on the at least one condition

500

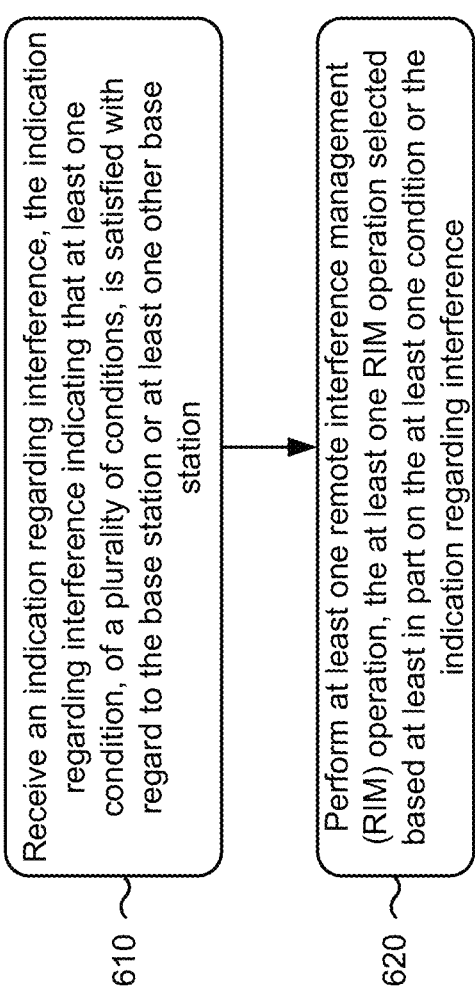

Receive an indication regarding interference, the indication regarding interference indicating that at least one condition, of a plurality of conditions, is satisfied with regard to the base station or at least one other base station

610

Perform at least one remote interference management (RIM) operation, the at least one RIM operation selected based at least in part on the at least one condition or the indication regarding interference

TRIGGERING MECHANISM FOR REMOTE INTERFERENCE MANAGEMENT

CROSS-REFERENCE TO RELATED APPLICATIONS

This application is a 371 national stage of PCT Application No. PCT/CN2019/107181 filed on Sep. 23, 2019, entitled "TRIGGERING MECHANISM FOR REMOTE INTERFERENCE MANAGEMENT," which claims priority to PCT Application No. PCT/CN2018/107182, filed on Sep. 24, 2018, entitled "TRIGGERING MECHANISM FOR REMOTE INTERFERENCE MANAGEMENT," which are hereby expressly incorporated by reference herein.

FIELD OF THE DISCLOSURE

Aspects of the present disclosure generally relate to wireless communication, and to techniques and apparatuses for a triggering mechanism for remote interference management (RIM).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM)

with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a base station, may include determining that at least one condition, of a plurality of conditions, is satisfied with regard to at least one other base station; and performing at least one RIM operation, wherein the at least one RIM operation is selected based at least in part on the at least one condition.

In some aspects, a base station for wireless communication may include memory and one or more processors coupled to the memory. The memory and the one or more processors may be configured to determine that at least one condition, of a plurality of conditions, is satisfied with regard to at least one other base station; and perform at least one RIM operation, the at least one RIM operation selected based at least in part on the at least one condition.

In some aspects, a non-transitory computer-readable medium may store one or more instructions for wireless communication. The one or more instructions, when executed by one or more processors of a base station, may cause the one or more processors to determine that at least one condition, of a plurality of conditions, is satisfied with regard to at least one other base station; and perform at least one RIM operation, the at least one RIM operation selected based at least in part on the at least one condition.

In some aspects, an apparatus for wireless communication may include means for determining that at least one condition, of a plurality of conditions, is satisfied with regard to at least one other base station; and means for performing at least one RIM operation, the at least one RIM operation selected based at least in part on the at least one condition.

In some aspects, a method of wireless communication, performed by a base station, may include receiving an indication regarding interference, wherein the indication regarding interference indicates that at least one condition, of a plurality of conditions, is satisfied with regard to the base station or at least one other base station; and performing at least one RIM operation, wherein the at least one RIM operation is selected based at least in part on the at least one condition or the indication regarding interference.

In some aspects, a base station for wireless communication may include memory and one or more processors coupled to the memory. The memory and the one or more processors may be configured to receive an indication regarding interference, the indication regarding interference indicating that at least one condition, of a plurality of conditions, is satisfied with regard to the base station or at least one other base station; and perform at least one RIM operation, the at least one RIM operation selected based at least in part on the at least one condition or the indication regarding interference.

In some aspects, a non-transitory computer-readable medium may store one or more instructions for wireless communication. The one or more instructions, when executed by one or more processors of a base station, may cause the one or more processors to receive an indication regarding interference, the indication regarding interference indicating that at least one condition, of a plurality of conditions, is satisfied with regard to the base station or at least one other base station; and perform at least one RIM operation, the at least one RIM operation selected based at least in part on the at least one condition or the indication regarding interference.

In some aspects, an apparatus for wireless communication may include means for receiving an indication regarding interference, the indication regarding interference indicating that at least one condition, of a plurality of conditions, is satisfied with regard to the base station or at least one other base station; and means for performing at least one RIM operation, the at least one RIM operation selected based at least in part on the at least one condition or the indication regarding interference.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example process performed, for example, by a base station, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
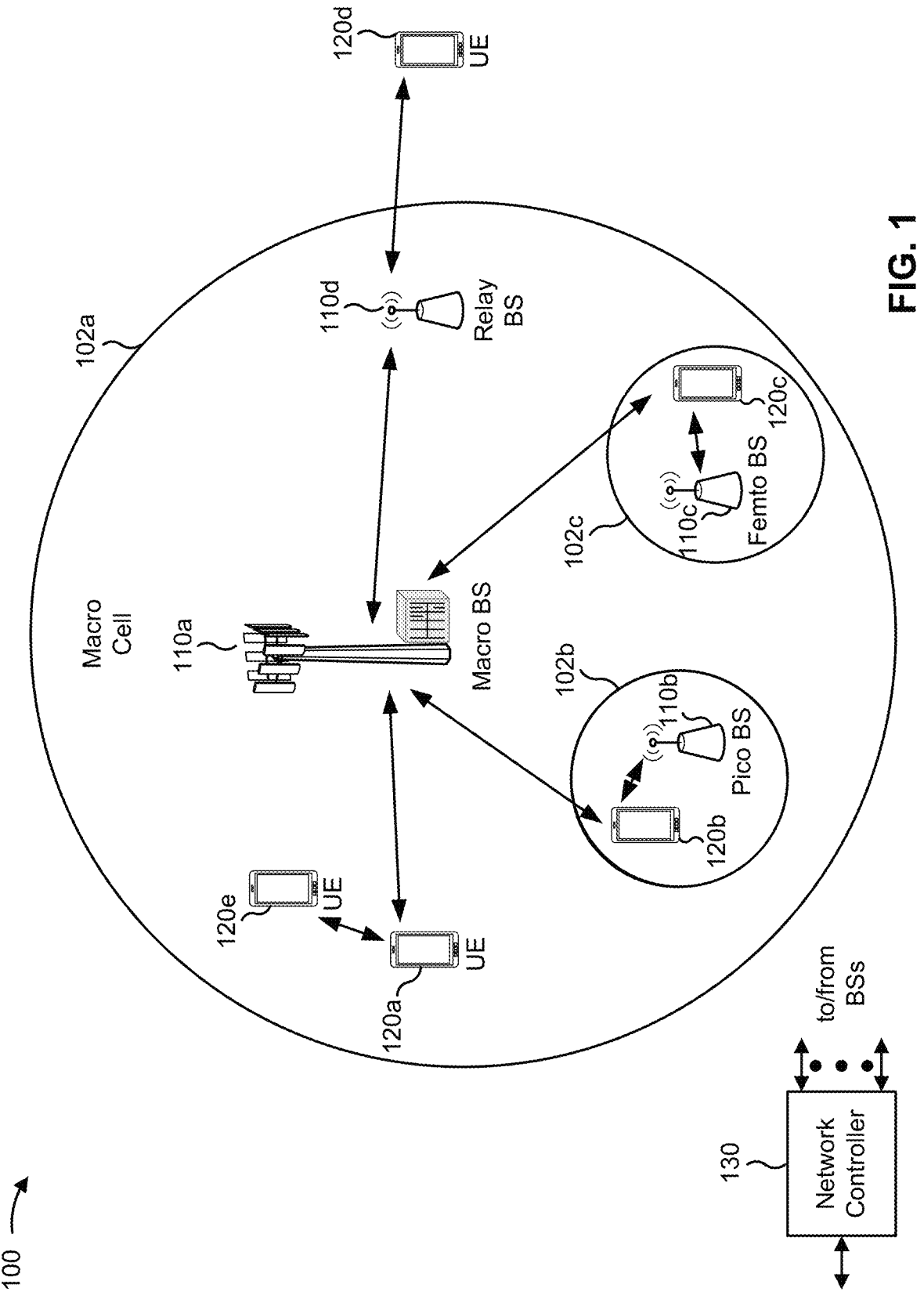
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, a biometric sensor or device, a wearable device (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
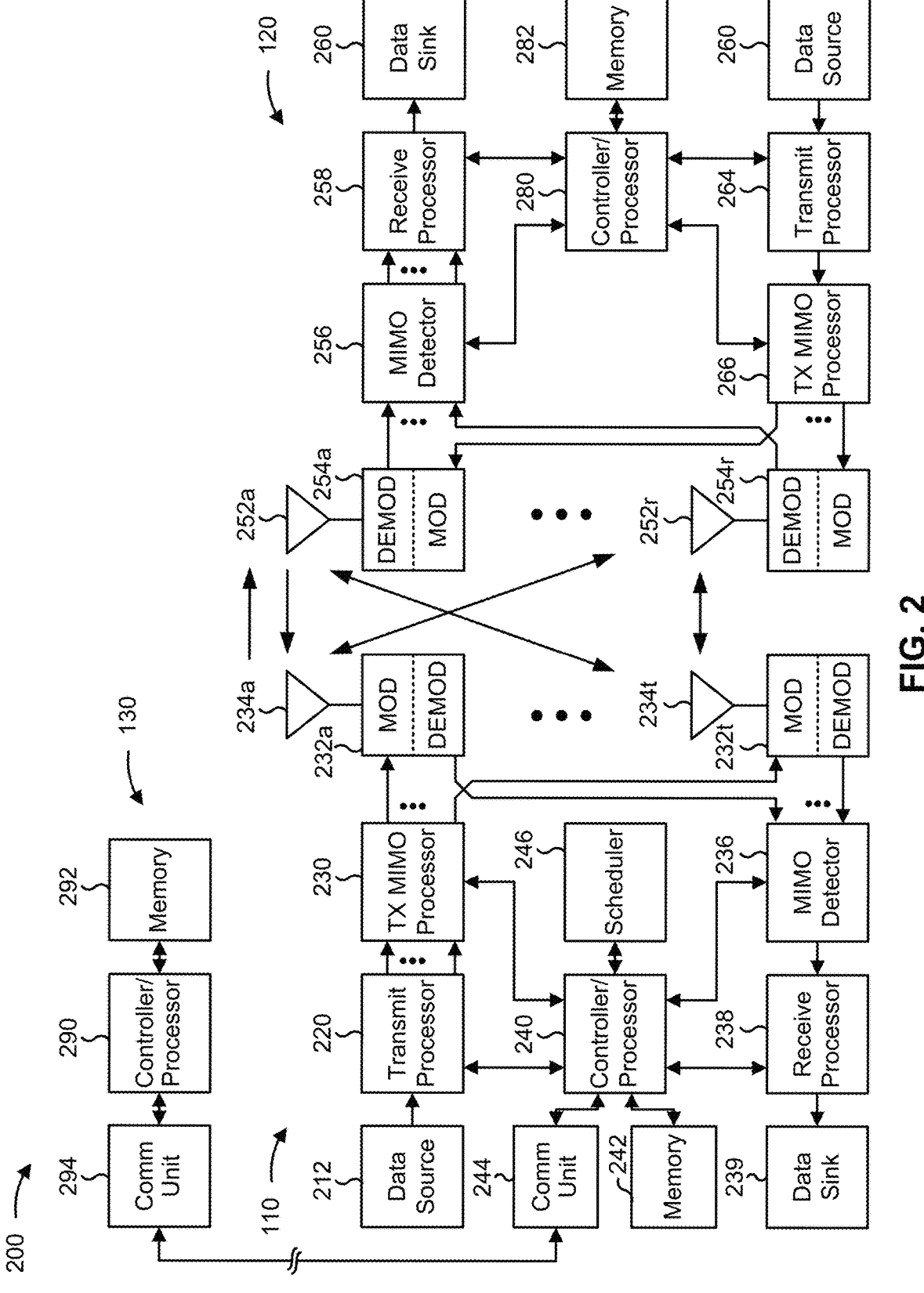
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with a triggering mechanism for remote interference management, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. A scheduler 246 may schedule UEs for data transmission on the downlink and/or uplink.

In some aspects, base station 110 may include means for determining that at least one condition, of a plurality of conditions, is satisfied with regard to at least one other base station; means for performing at least one RIM operation, the at least one RIM operation selected based at least in part on the at least one condition; means for receiving an indication regarding interference, the indication regarding interference indicating that at least one condition, of a plurality of conditions, is satisfied with regard to the base station or at least one other base station; means for performing at least one RIM operation, the at least one RIM operation selected based at least in part on the at least one condition or the indication regarding interference; and/or the like. In some aspects, such means may include one or more components of base station 110 described in connection with FIG. 2.

As indicated above, FIG. 2 is provided merely as an example. Other examples may differ from what is described with regard to FIG. 2.

In most scenarios, the downlink signal of a base station is observable within and around the edges of coverage areas of cells provided by the base station. In some cases, however, the downlink signal of the base station may propagate far beyond the coverage area (e.g., by tens of kilometers, hundreds of kilometers, and/or the like) due to atmospheric ducting, reflections (e.g., by mountains, the ocean surface, or clouds), and/or the like. In such a case, the downlink signal of the base station may create interference for another base station. The base station that transmits the downlink signal may be referred to as an aggressor base station and the base station that receives the downlink signal may be referred to as a victim base station.

This interference may occur when the aggressor base station and the victim base station have the same time division duplexing (TDD) configuration. This may occur because the aggressor base station and the victim base station are far apart, so normal interference countermeasures (e.g., different TDD configurations, gaps, and/or the like) may not take into account both the victim base station and the aggressor base station. A downlink signal of the aggressor base station, with the propagation delay between the aggressor base station and the victim base station, may overlap into an uplink portion of the victim base station's frame configuration. This may cause interference between the victim base station and uplink communications to the victim base station. This form of remote interference is described in more detail in connection with FIG. 3, below.

The victim base station, the aggressor base station, and/or another device (e.g., a UE associated with the victim base station, a network device, an operation, administration, or management (OAM) device, and/or the like) may perform one or more remote interference management (RIM) operations to mitigate remote interference. In some aspects, two or more devices may cooperate to mitigate remote interference. However, a static or inflexible RIM triggering paradigm, using a single trigger condition or a single threshold, may not provide sufficient flexibility for handling different remote interference levels or types. Thus, performance of RIM may be limited in such a system.

Some techniques and apparatuses described herein provide for the triggering of one or more RIM operations based at least in part on the satisfaction of one or more conditions.

For example, the one or more RIM operations may be performed by any one or more of an aggressor base station, a victim base station, a core network device, an OAM device, and/or the like. In some aspects, a condition or set of conditions may be associated with multiple different thresholds based at least in part on which different RIM operations may be triggered. By providing triggers for RIM operations based at least in part on multiple different conditions, flexibility of remote interference management is improved, thereby enabling the handling of different types of remote interference, different intensities of remote interference, and so on. Furthermore, by providing triggers for RIM operations based at least in part on multiple different triggers, efficiency of resource allocation may be improved. For example, the usage of multiple different triggers may allow a more granular level of response to be performed to mitigate remote interference in comparison to automatically performing a single RIM operation or a single type of RIM operation at the aggressor base station and/or the victim base station.

Figure 3:
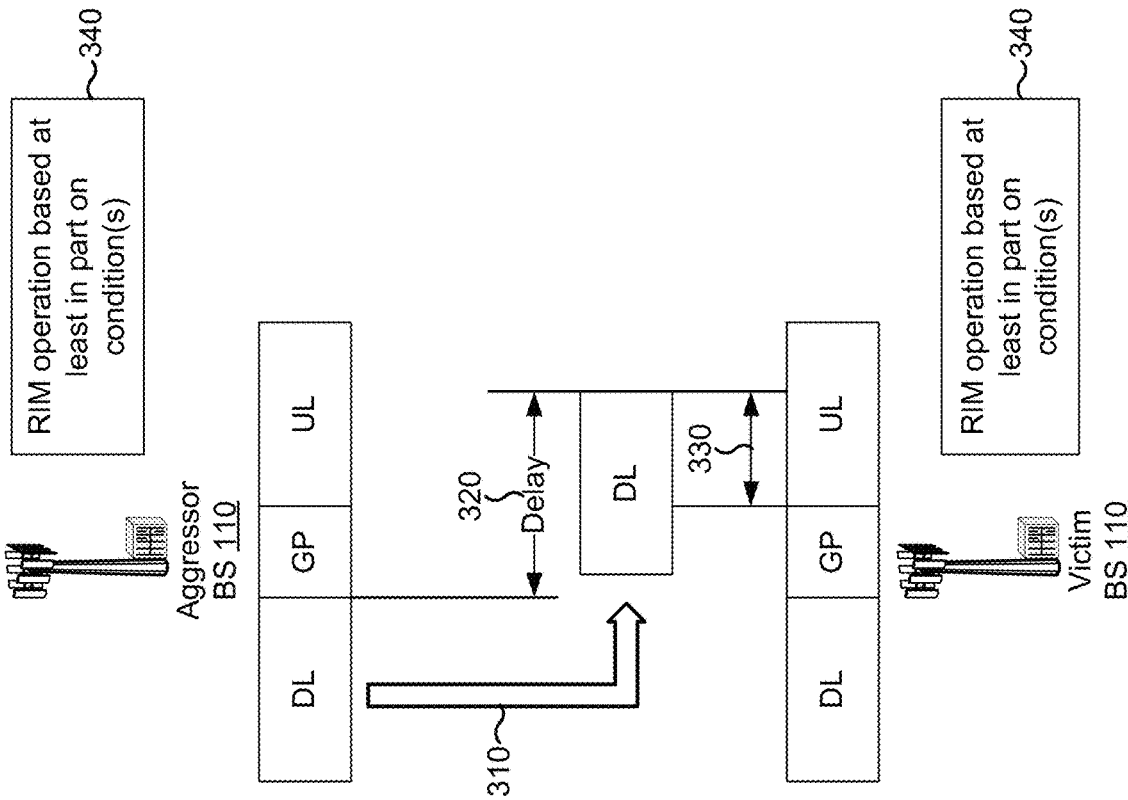
FIG. 3 is a diagram illustrating an example of remote interference between an aggressor base station and a victim base station, in accordance with various aspects of the present disclosure.

FIG. 3 is a diagram illustrating an example 300 of remote interference between an aggressor base station and a victim base station, in accordance with various aspects of the present disclosure. As shown, example 300 includes an aggressor base station (e.g., BS 110) and a victim base station (e.g., BS 110). The aggressor base station may be physically distant from the victim base station (e.g., by tens of kilometers, hundreds of kilometers, and/or the like). As further shown, the aggressor base station and the victim base station have the same TDD configuration. This may mean that the aggressor base station and the victim base station's downlink periods, uplink periods, and gap periods are aligned in time.

As shown by reference number 310, a downlink signal transmitted by the aggressor base station may reach the victim base station. For example, the downlink signal may be reflected, may travel via an atmospheric duct, and/or the like. As shown by reference number 320, the downlink signal may be associated with a delay, such as a propagation delay. As shown by reference number 330, due to the delay, the downlink signal from the aggressor base station may overlap an uplink reception of the victim base station. For example, the victim base station may detect the downlink signal during the uplink period of the victim base station's frame configuration. Thus, the downlink signal may cause interference for the uplink reception of the victim base station.

As shown by reference number 340, the victim base station and/or the aggressor base station may perform one or more RIM operations based at least in part on the interference from the aggressor base station. For example, the victim base station and/or the aggressor base station may determine that one or more conditions are satisfied in association with the interference, and may select one or more RIM operations to perform based at least in part on the one or more conditions. In this way, the victim base station and the aggressor base station may determine RIM operations to perform based at least in part on a set of conditions that are satisfied with regard to the interference, thereby enabling a more granular approach to remote interference management in comparison to a single-threshold approach.

As indicated above, FIG. 3 is provided as an example. Other examples may differ from what is described with respect to FIG. 3.

Figure 4:
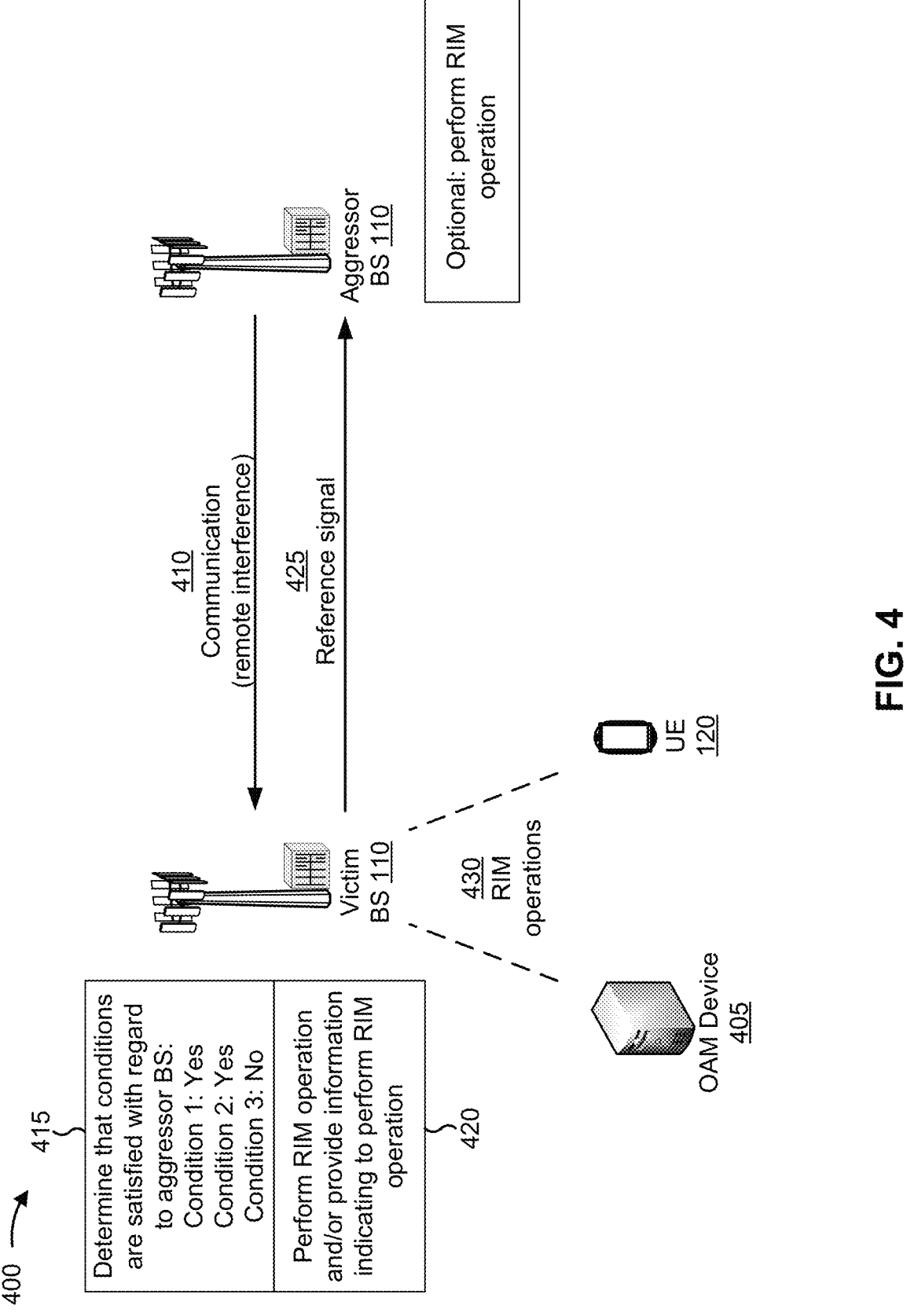
FIG. 4 is a diagram illustrating an example of a triggering mechanism for remote interference management, in accordance with various aspects of the present disclosure.

FIG. 4 is a diagram illustrating an example 400 of a triggering mechanism for remote interference management, in accordance with various aspects of the present disclosure.

As shown, example 400 includes a victim base station 110, an aggressor base station 110, a UE 120, and an OAM device 405. The OAM device 405 may perform operations related to operation, administration, and/or management of a network of example 400 (e.g., a 5G/NR network or another type of network). In some aspects, the OAM device 405 may comprise or be associated with a network device, a core network device, a network function, a self-organizing network device, and/or the like. In some aspects, the victim base station, the aggressor base station, and/or the OAM device 405 may communicate via backhaul links. In some aspects, the victim base station and the aggressor base station may communicate via an air interface (e.g., a backhaul air interface or an access network air interface).

The operations described in connection with FIG. 4 are primarily described with regard to a single victim base station and a single aggressor base station. However, these operations are equally applicable with regard to a single victim base station and multiple aggressor base stations, a single aggressor base station and multiple victim base stations, or multiple victim base stations and multiple aggressor base stations.

As shown in FIG. 4, and by reference number 410, the aggressor base station may transmit a communication (e.g., a downlink transmission, downlink data, and/or the like). As further shown, the communication may cause remote interference for the victim base station. For example, the communication may interfere with an uplink communication of the victim base station. In some aspects, the victim base station may identify the interference and/or the aggressor base station based at least in part on a reference signal. For example, the aggressor base station may transmit a reference signal as part of the communication or in association with the communication that may identify the aggressor base station.

As shown by reference number 415, the victim base station may determine that a set of conditions (e.g., one or more conditions) is satisfied with regard to the aggressor base station (e.g., and/or the communication of the aggressor base station). In some aspects, another device may determine that the set of conditions is satisfied (e.g., OAM device 405 and/or the like).

In some aspects, a condition may relate to the interference of the aggressor base station. In some aspects, a condition may be based at least in part on a threshold. As examples, a condition may be based at least in part on the presence or detection of interference (e.g., irrespective of a power level of the interference), a power threshold of the interference (e.g., −90 dBm, −70 dBm, and/or the like), a shape of the interference (e.g., with regard to time and/or power), a time threshold associated with the interference (e.g., the interference occurs for less than a threshold time period, the interference occurs for at least the threshold time period, and/or the like), a detection probability (e.g., a probability of detecting interference, a probability of successfully decoding a non-interfering communication, and/or the like), and/or the like.

In some aspects, the aggressor base station may determine that a condition is satisfied. For example, such a condition may be based at least in part on the reception of a reference signal (described in connection with reference number 425, below). When the aggressor base station receives the reference signal, the aggressor base station may determine that the condition is satisfied, and may perform one or more RIM operations accordingly.

In some aspects, a condition or a set of conditions may be associated with multiple, different thresholds. For example, a condition may map to a first RIM operation when a first interference power level is satisfied, may map to a second RIM operation when a second interference power level different than the first interference power level is satisfied, may map to a third RIM operation when a third interference power level different than the first and second interference power levels is satisfied, and so on. In some aspects, the first, second, and third RIM operations may involve different devices or different levels of interference management (e.g., the first RIM operation may be a least aggressive RIM operation, the second RIM operation may be more aggressive than the first RIM operation, and so on). In this way, a granular and measured response is provided for remote interference, which may be more resource-efficient than automatically performing a more aggressive RIM operation when a less aggressive RIM operation may suffice.

As shown by reference number 420, the victim base station may perform a RIM operation and/or provide information indicating to perform a RIM operation based at least in part on determining that the set of conditions is satisfied. In some aspects, the victim base station may identify a RIM operation to perform based at least in part on a mapping between RIM operations and conditions. For example, there may be N condition sets (e.g., sets of conditions) and M sets of RIM operations. The M sets of RIM operations may include operations performed by an individual device (e.g., the victim base station, the aggressor base station, the OAM device 405, the UE 120, and/or another device) or operations performed by a combination of two or more of these devices. A device may determine which set of RIM operations, of the M sets of RIM operations, is to be performed based at least in part on which condition set, of the M condition sets, is satisfied.

In some aspects, a RIM operation performed by the victim base station may include causing an uplink user (e.g., UE 120) to increase a transmit power, reconfiguring an uplink slot structure (e.g., enlarging a gap length to ensure that the remote interference is received in the GAP range), blanking or dropping interfered uplink symbols in an uplink transmission (e.g., of the UE 120), receive beam interference nullification, and/or the like.

As shown by reference number 425, in some aspects, the RIM operation may include transmitting an indication regarding interference to the aggressor base station. Here, the indication regarding interference is a reference signal. The indication may indicate that the victim base station has detected remote interference associated with the aggressor base station. In some aspects, the indication may be associated with a condition for the aggressor base station. For example, the aggressor base station may identify one or more RIM operations to perform based at least in part on the indication regarding interference. In some aspects, the victim base station may provide the indication regarding interference to the aggressor base station via a backhaul link. In some aspects, the victim base station may provide the indication to the aggressor base station via an access network. In some aspects, the victim base station may provide the indication to the aggressor base station via another device (e.g., the OAM device 405). In some aspects, another device may provide the indication to the aggressor base station. For example, the OAM device 405 may provide the indication to the aggressor base station (e.g., based at least in part on an indication from the victim base station or based at least in part on determining that one or more conditions are satisfied).

As shown by reference number 430, in some aspects, the UE 120 and/or the OAM device 405 may perform a RIM operation. As an example, a RIM operation performed by the UE 120 may include performing a backoff with regard to transmit power of the UE 120, which may assist the victim base station in measuring the interference. As another example, a RIM operation performed by the UE 120 may include measuring the interference in a downlink of the UE 120 and transmitting a report indicating the measurement to the victim base station. In some aspects, the OAM device 405 may configure one or more devices as a RIM operation. For example, the OAM device 405 may configure a TDD configuration or frame structure of the victim base station and/or the aggressor base station to mitigate the interference.

In some aspects, the victim base station and the aggressor base station may cooperate as part of a RIM operation. For example, the victim base station and the aggressor base station may negotiate a frame structure or TDD configuration (e.g., enlarging a gap, reducing the downlink portion of the aggressor base station, and/or the like).

In some aspects, the aggressor base station may perform a RIM operation. For example, the RIM operation may include reducing a downlink transmission power (e.g., reducing a beam gain, reducing power of the aggressor base station, and/or the like), modifying a downlink beam direction (e.g., lower a beam angle (e.g., down-tilting), laterally change the beam angle, and/or the like), reconfigure a downlink slot structure (e.g., reduce the number of downlink symbols, enlarge a gap of the slot structure, and/or the like).

As an example, consider a set of N conditions that includes two conditions: Condition 1 and Condition 2. The corresponding M RIM operation sets may include a RIM operation by the victim base station and a RIM operation by the aggressor base station. In that case, the victim base station and the aggressor base station may identify which combination of the RIM operations is to be performed based at least in part on whether Condition 1 and/or Condition 2 are satisfied or not satisfied. For example, when Condition 1 and Condition 2 are satisfied (e.g., simultaneously, contemporaneously), the RIM operations of the victim base station and the aggressor base station may be triggered. When Condition 1 is satisfied and Condition 2 is not satisfied, the RIM operation of the victim base station may be triggered without triggering the RIM operation of the aggressor base station. When Condition 1 is not satisfied and Condition 2 is satisfied, the RIM operation of the aggressor base station may be triggered without triggering the RIM operation of the victim base station. When neither Condition 1 nor Condition 2 is satisfied, no RIM operation may be triggered. Of course, the above is provided only as an example, and other examples are possible.

As another example, consider a condition that is associated with multiple different interference power level thresholds. In such a case, the victim base station, the aggressor base station, and the OAM device 405 may select RIM operations to perform based at least in part on which thresholds, of the multiple different interference power level thresholds, are satisfied. For example, if the interference power level does not satisfy a first threshold (e.g., −110 dBm or a different value), no RIM operation may be performed. If the interference power level satisfies the first threshold and does not satisfy a second threshold (e.g., −90 dBm or a different value), only the victim base station may perform a RIM operation. If the interference power level satisfies the second threshold, then the victim base station and the aggressor base station may perform RIM operations. If the interference power level continues to satisfy the second threshold after the RIM operations or performed, then another device may perform a RIM operation (e.g., the OAM device 405, and/or the like).

As indicated above, FIG. 4 is provided as an example. Other examples may differ from what is described with respect to FIG. 4.

Figure 5:
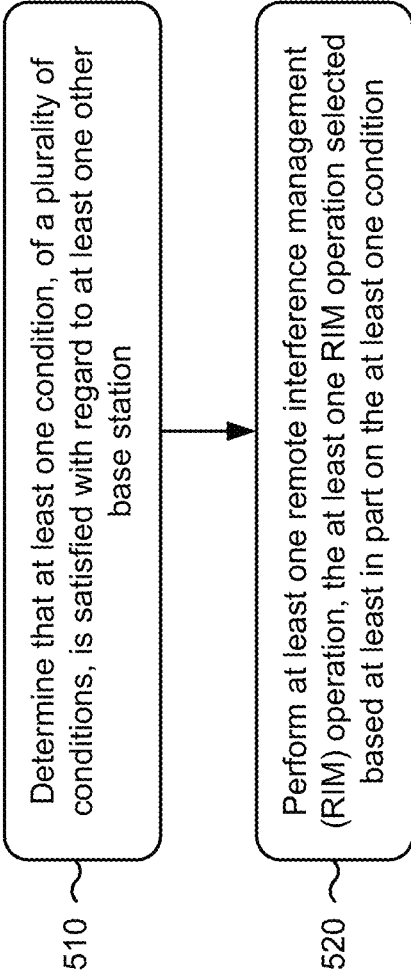
FIG. 5 is a diagram illustrating an example process performed, for example, by a base station, in accordance with various aspects of the present disclosure.

FIG. 5 is a diagram illustrating an example process 500 performed, for example, by a base station, in accordance with various aspects of the present disclosure. Example process 500 is an example where a base station (e.g., BS 110, the victim base station of FIGS. 3 and/or 4, and/or the like) performs remote interference management based at least in part on a triggering mechanism.

As shown in FIG. 5, in some aspects, process 500 may include determining that at least one condition, of a plurality of conditions, is satisfied with regard to at least one other base station (block 510). For example, the base station (e.g., using antenna 234, DEMOD 232, MIMO detector 236, receive processor 238, controller/processor 240, and/or the like) may determine that at least one condition, of a plurality of conditions, is satisfied with regard to at least one other base station. The plurality of conditions may relate to remote interference of the at least one other base station with regard to the base station.

As shown in FIG. 5, in some aspects, process 500 may include performing at least one remote interference management (RIM) operation, the at least one RIM operation selected based at least in part on the at least one condition (block 520). For example, the base station may (e.g., using controller/processor 240, transmit processor 220, TX MIMO processor 230, MOD 232, antenna 234, and/or the like) perform at least one remote interference management operation that is selected (e.g., by the base station or by a different device) based at least in part on the at least one condition. In some aspects, the base station may cause another device to perform a RIM operation. In some aspects, another device may perform a RIM operation independently of the base station. In some aspects, another device may perform a RIM operation cooperatively with the base station.

Process 500 may include additional aspects, such as any single aspect or any combination of aspects described below and/or in connection with one or more other processes described elsewhere herein.

With respect to process 500, in a first aspect, the at least one RIM operation includes transmitting an indication regarding interference to the at least one other base station. With respect to process 500, in a second aspect, alone or in combination with the first aspect, the at least one RIM operation further includes another RIM operation performed by the base station. With respect to process 500, in a third aspect, alone or in combination with the first aspect and/or the second aspect, the indication indicates that the at least one other base station is to reduce a transmission power. With respect to process 500, in a fourth aspect, alone or in combination with any one or more of the first through third aspects, the indication indicates that the at least one other base station is to modify a beam direction. With respect to process 500, in a fifth aspect, alone or in combination with any one or more of the first through fourth aspects, the indication indicates that the at least one other base station is to change a slot structure.

With respect to process 500, in a sixth aspect, alone or in combination with any one or more of the first through fifth aspects, the at least one RIM operation includes changing an uplink slot structure of the base station. With respect to process 500, in a seventh aspect, alone or in combination with any one or more of the first through sixth aspects, the at least one RIM operation includes blanking one or more interfered symbols. With respect to process 500, in an eighth aspect, alone or in combination with any one or more of the first through seventh aspects, the at least one RIM operation includes causing a user equipment to provide a signal for identifying interference associated with the at least one other base station. With respect to process 500, in a ninth aspect, alone or in combination with any one or more of the first through eighth aspects, the at least one RIM operation includes causing a user equipment to perform a backoff or determine an interference measurement. With respect to process 500, in a tenth aspect, alone or in combination with any one or more of the first through ninth aspects, the at least one RIM operation includes providing an indication to cause an operations, administration, or management device to perform a RIM operation. With respect to process 500, in an eleventh aspect, alone or in combination with any one or more of the first through tenth aspects, the at least one RIM operation includes negotiating a frame structure with the at least one other base station.

With respect to process 500, in a twelfth aspect, alone or in combination with any one or more of the first through eleventh aspects, the at least one condition is based at least in part on a threshold power. With respect to process 500, in a thirteenth aspect, alone or in combination with any one or more of the first through twelfth aspects, the at least one condition is based at least in part on at least one of a threshold interference time or an interference shape. With respect to process 500, in a fourteenth aspect, alone or in combination with any one or more of the first through thirteenth aspects, the at least one condition is based at least in part on a detection probability. With respect to process 500, in a fourteenth aspect, alone or in combination with any one or more of the first through thirteenth aspects, the at least one condition is based at least in part on a threshold detection probability. With respect to process 500, in a fifteenth aspect, alone or in combination with any one or more of the first through fourteenth aspects, a first condition of the plurality of conditions is associated with a first threshold, and a second condition of the plurality of conditions is associated with a second threshold different than the first threshold.

With respect to process 500, in a sixteenth aspect, alone or in combination with any one or more of the first through fifteenth aspects, the at least one condition is satisfied when the base station has transmitted an indication regarding interference to the at least one other base station. With respect to process 500, in a seventeenth aspect, alone or in combination with any one or more of the first through sixteenth aspects, the at least one RIM operation is selected based at least in part on one or more mappings between a plurality of RIM operations and the plurality of conditions. With respect to process 500, in an eighteenth aspect, alone or in combination with any one or more of the first through seventeenth aspects, the at least one RIM operation includes one or more operations by the at least one other base station and one or more operations by an operations, administration, or management device.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a diagram illustrating an example process 600 performed, for example, by a base station, in accordance with various aspects of the present disclosure. Example process 600 is an example where a base station (e.g., BS 110, the aggressor base station of FIGS. 3 and/or 4, and/or the like) performs remote interference management based at least in part on a triggering mechanism.

As shown in FIG. 6, in some aspects, process 600 may include receiving an indication regarding interference, wherein the indication regarding interference indicates that at least one condition, of a plurality of conditions, is satisfied with regard to the base station or at least one other base station (block 610). For example, the base station (e.g., using antenna 234, DEMOD 232, MIMO detector 236, receive processor 238, controller/processor 240, and/or the like) may receive an indication regarding interference. In some aspects, the base station may receive the indication regarding interference via an access network. In some aspects, the base station may receive the indication regarding interference via a backhaul link. In some aspects, the base station may receive the indication regarding interference from a victim base station that receives interference. The indication regarding interference may indicate that at least one condition, of a plurality of conditions, is satisfied with regard to the base station or at least one other base station.

As shown in FIG. 6, in some aspects, process 600 may include performing at least one remote interference management (RIM) operation, wherein the at least one RIM operation is selected based at least in part on the at least one condition or the indication regarding interference (block 620). For example, the base station (e.g., using controller/processor 240, transmit processor 220, TX MIMO processor 230, MOD 232, antenna 234, and/or the like) may perform at least one RIM operation. The at least one RIM operation may be selected based at least in part on the at least one condition or the indication regarding the interference.

Process 600 may include additional aspects, such as any single aspect or any combination of aspects described below and/or in connection with one or more other processes described elsewhere herein.

With respect to process 600, in a first aspect, the at least one RIM operation includes reducing a transmission power. With respect to process 600, in a second aspect, alone or in combination with the first aspect, the at least one RIM operation includes modifying a beam direction. With respect to process 600, in third aspect, alone or in combination with the first aspect and/or the second aspect, the at least one RIM operation includes changing or negotiating, with the at least one other base station, a slot structure. With respect to process 600, in a fourth aspect, alone or in combination with any one or more of the first through third aspects, the indication is received from an operations, administration, or management device. With respect to process 600, in a fifth aspect, alone or in combination with any one or more of the first through fourth aspects, the at least one condition is based at least in part on a threshold power. With respect to process 600, in a sixth aspect, alone or in combination with any one or more of the first through fifth aspects, the at least one condition is based at least in part on at least one of a threshold interference time or an interference shape. With respect to process 600, in a seventh aspect, alone or in combination with any one or more of the first through sixth aspects, the at least one condition is based at least in part on a detection probability. With respect to process 600, in an eighth aspect, alone or in combination with any one or more of the first through seventh aspects, the at least one condition is based at least in part on a threshold detection probability. With respect to process 600, in a ninth aspect, alone or in combination with any one or more of the first through eighth aspects, a first condition of the plurality of conditions is associated with a first threshold, and a second condition of the plurality of conditions is associated with a second threshold different than the first threshold.

With respect to process 600, in a tenth aspect, alone or in combination with any one or more of the first through ninth aspects, the at least one RIM operation is selected based at least in part on one or more mappings between a plurality of RIM operations and the plurality of conditions. With respect to process 600, in an eleventh aspect, alone or in combination with any one or more of the first through tenth aspects, the at least one RIM operation includes one or more operations by the at least one other base station and one or more operations by an operations, administration, or management device.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a base station, comprising:

determining that at least one interference condition, of a first set of interference conditions of a plurality of sets of interference conditions, is satisfied, wherein the interference condition corresponds to an occurrence of interference associated with at least one other base station, wherein the first set of interference conditions corresponds to detection by one of the base station or the at least one other base station, and a second set of interference conditions, of the plurality of sets of interference conditions, correspond to detection by the other of the base station or the at least one other base station; and performing at least one remote interference management operation, wherein the at least one remote interference management operation is selected from a first set of interference management operations, of a plurality of sets of interference management operations, based at least in part on the at least one interference condition and a mapping between the first set of interference management operations and the first set of interference conditions.

2. The method of claim 1, wherein the at least one remote interference management operation includes transmitting an indication regarding interference to the at least one other base station.

3. The method of claim 2, wherein the at least one remote interference management operation further includes another remote interference management operation performed by the base station.

4. The method of claim 2, wherein the indication indicates that the at least one other base station is to reduce a transmission power.

5. The method of claim 2, wherein the indication indicates that the at least one other base station is to modify a beam direction.

6. The method of claim 2, wherein the indication indicates that the at least one other base station is to change a slot structure.

7. The method of claim 1, wherein the at least one remote interference management operation includes changing an uplink slot structure of the base station.

8. The method of claim 1, wherein the at least one remote interference management operation includes blanking one or more interfered symbols.

9. The method of claim 1, wherein the at least one remote interference management operation includes causing a user equipment to provide a signal for identifying interference associated with the at least one other base station.

10. The method of claim 1, wherein the at least one remote interference management operation includes causing a user equipment to perform a backoff or determine an interference measurement.

11. The method of claim 1, wherein the at least one remote interference management operation includes providing an indication to cause an operations, administration, or management device to perform a remote interference management operation.

12. The method of claim 1, wherein the at least one remote interference management operation includes negotiating a frame structure with the at least one other base station.

13. The method of claim 1, wherein the at least one interference condition is based at least in part on a threshold power.

14. The method of claim 1, wherein the at least one interference condition is based at least in part on at least one of a threshold interference time, or an interference shape.

15. The method of claim 1, wherein the at least one interference condition is based at least in part on a detection probability.

16. The method of claim 1, wherein a first interference condition of the first set of interference conditions is associated with a first threshold, and wherein a second interference condition of a second set of interference conditions of the plurality of sets of interference conditions is associated with a second threshold different than the first threshold.

17. The method of claim 1, wherein the at least one interference condition is satisfied when the base station has transmitted an indication regarding interference to the at least one other base station.

18. The method of claim 1, wherein the plurality of sets of remote interference management operations map to the plurality of sets of interference conditions.

19. A method of wireless communication performed by a base station, comprising:

receiving, from another base station, an indication regarding an occurrence of interference, wherein the indication indicates that at least one interference condition, of a first set of interference conditions of a plurality of sets of interference conditions, is satisfied with regard to the base station or the other base station, wherein the first set of interference conditions corresponds to detection by one of the base station or the other base station, and a second set of interference conditions, of the plurality of sets of interference conditions, correspond to detection by the other of the base station or the other base station; and performing at least one remote interference management operation, wherein the at least one remote interference management operation is selected from a first set of interference management operations, of a plurality of sets of interference management operations, based at least in part on the at least one interference condition, the indication regarding interference, and a mapping between the first set of interference management operations and the first set of interference conditions.

20. The method of claim 19, wherein the at least one remote interference management operation includes reducing a transmission power.

21. The method of claim 19, wherein the at least one remote interference management operation includes modifying a beam direction.

22. The method of claim 19, wherein the at least one remote interference management operation includes changing or negotiating, with the other base station, a slot structure.

23. The method of claim 19, wherein the indication is received from an operations, administration, or management device.

24. The method of claim 19, wherein the at least one interference condition is based at least in part on a threshold power.

25. The method of claim 19, wherein the at least one interference condition is based at least in part on at least one of:

a threshold interference time, or an interference shape.

26. The method of claim 19, wherein the at least one interference condition is based at least in part on a detection probability.

27. The method of claim 19, wherein a first interference condition of the first set of interference conditions is associated with a first threshold, and wherein a second interference condition of a second set of interference conditions of the plurality of sets of interference conditions is associated with a second threshold different than the first threshold.

28. The method of claim 19, wherein the plurality of sets of remote interference management operations map to the plurality of sets of interference conditions.

29. A base station for wireless communication, comprising:

one or more memories; and one or more processors, the one or more processors, individually or collectively and based at least in part on information stored in the one or more memories, being configured to:

determine that at least one interference condition, of a first set of interference conditions of a plurality of sets of interference conditions, is satisfied, wherein the interference condition corresponds to an occurrence of interference associated with at least one other base station, wherein the first set of interference conditions corresponds to detection by one of the base station or the at least one other base station, and a second set of interference conditions, of the plurality of sets of interference conditions, correspond to detection by the other of the base station or the at least one other base station; and perform at least one remote interference management operation, the at least one remote interference management operation selected from a first set of interference management operations, of a plurality of sets of interference management operations, based at least in part on the at least one interference condition and a mapping between the first set of interference management operations and the first set of interference conditions.

30. A base station for wireless communication, comprising:

one or more memories; and one or more processors, the one or more processors, individually or collectively and based at least in part on information stored in the one or more memories, being configured to:

receive, from another base station, an indication regarding an occurrence of interference, wherein the indication indicates that at least one interference condition, of a first set of interference conditions of a plurality of sets of interference conditions, is satisfied with regard to the base station or the other base station, wherein the first set of interference conditions corresponds to detection by one of the base station or the other base station, and a second set of interference conditions, of the plurality of sets of interference conditions, correspond to detection by the other of the base station or the other base station; and perform at least one remote interference management operation, the at least one remote interference management operation selected from a first set of interference management operations, of a plurality of sets of interference management operations, based at least in part on the at least one interference condition, the indication regarding interference, and a mapping between the first set of interference management operations and the first set of interference conditions.

* * * * *